(12) United States Patent
Brocheton

(10) Patent No.: US 6,449,418 B1
(45) Date of Patent: Sep. 10, 2002

(54) CASSETTE STACK OPENING ON BOTH SIDES

(75) Inventor: Stéphane Brocheton, Leves (FR)

(73) Assignee: Corning Cables Systems S.A., Favieres (FR)

(*) Notice: Subject to any disclaimer, the term of this patent is extended or adjusted under 35 U.S.C. 154(b) by 0 days.

(21) Appl. No.: 09/719,530
(22) PCT Filed: Feb. 8, 2000
(86) PCT No.: PCT/FR00/00287
§ 371 (c)(1),
(2), (4) Date: Dec. 13, 2000
(87) PCT Pub. No.: WO00/68722
PCT Pub. Date: Nov. 16, 2000

(30) Foreign Application Priority Data

May 11, 1999 (FR) .............................................. 99 05990

(51) Int. Cl.[7] ................................................. G02B 6/00
(52) U.S. Cl. ........................................ 385/135; 385/134
(58) Field of Search ................................. 385/134–137, 385/147, 53

(56) References Cited

U.S. PATENT DOCUMENTS

| | | | |
|---|---|---|---|
| 4,911,521 A | * | 3/1990 | Ryuto et al. ................. 358/135 |
| 5,323,478 A | | 6/1994 | Milanowski |
| 5,734,777 A | * | 3/1998 | Merriken et al. ........... 385/135 |
| 6,016,378 A | | 1/2000 | Cuny |

FOREIGN PATENT DOCUMENTS

WO    WO 95 30165    11/1995

* cited by examiner

*Primary Examiner*—Brian Sircus
*Assistant Examiner*—Son V. Nguyen
(74) *Attorney, Agent, or Firm*—Pearne & Gordon LLP

(57) ABSTRACT

In this stack of two cassettes (A, B), when a detachable connector bar (20) is snapped onto the shafts (13), the rotation of one of the cassettes relative to the other makes the second catch (19) come into the recess (18), and keeps the cassettes open.

10 Claims, 1 Drawing Sheet

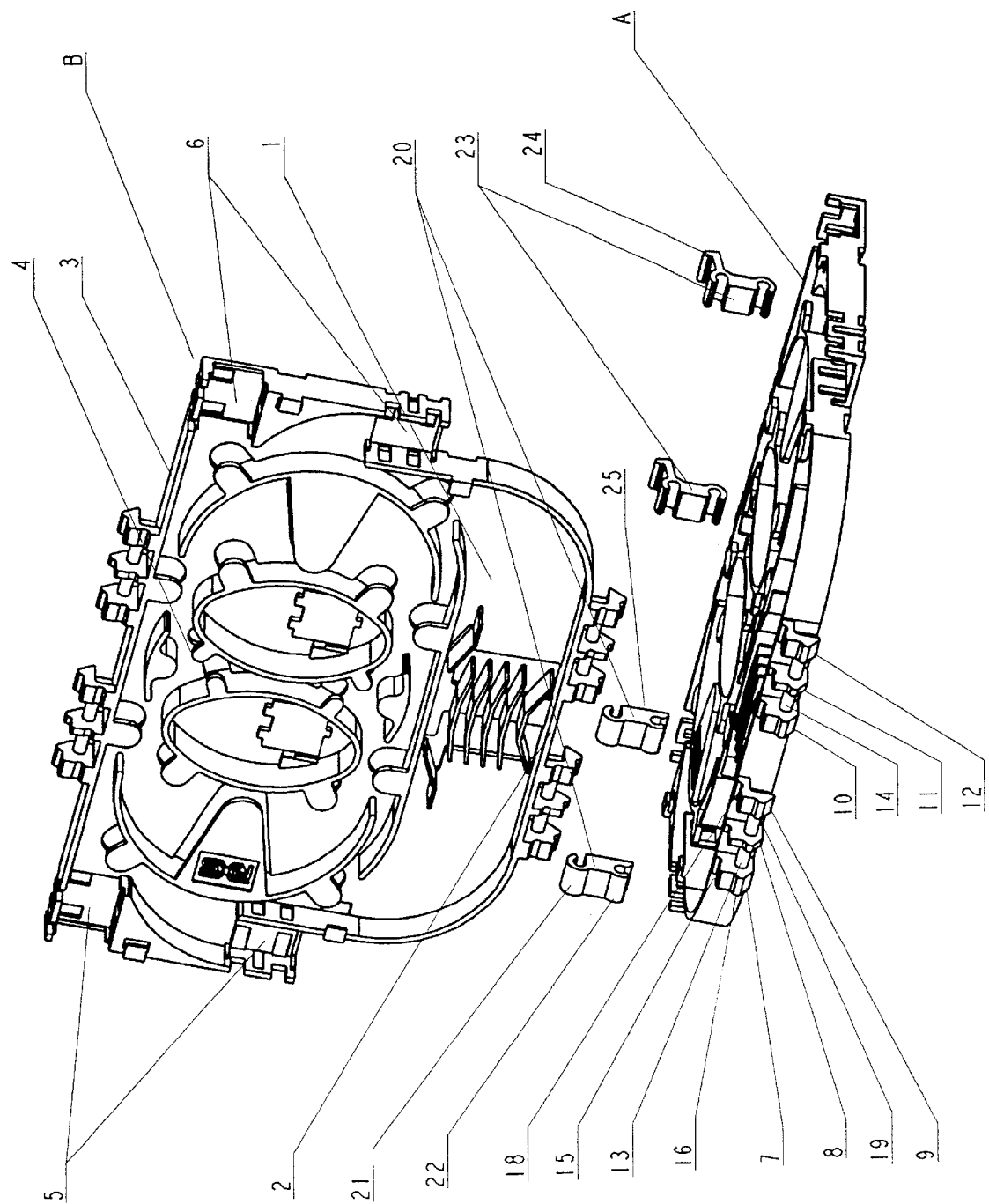

CASSETTE STACK OPENING ON BOTH SIDES

BACKGROUND OF THE INVENTION AND RELATED ART

The invention relates to stacks of cassettes, and in particular to stacks of cassettes which are designed to receive conductors. In the present description, conductors mean both elements in the form of wires or strips in which light can be propagated, among others optical fibres, and elements in the form of wires or strips for conducting electricity, among others metal wires, which for example are made of copper, or copper telephone wires.

In telecommunications, optical fibres are organised in a stack of cassettes. In general, each cassette comprises a base and two lateral walls. A baffle which defines a path is provided on the base, and makes it possible to comply with the constraints of minimum radius of curvature of the conductors. In general, each cassette comprises a lateral inlet and an outlet for the conductors.

A stack of cassettes is already known which is articulated on one side, in pairs, by a flexible hinge. A cassette can be kept open at approximately 90° from the cassette beneath it by means of a hook extending from a lateral wall of the upper cassette, which is placed behind a boss provided on a lug which extends from the edge of the lower cassette. The upper cassette cannot go beyond aposition of 90°, owing to the fact that stop elements are provided on the two opposite edges of the two cassettes.

A stack of cassettes of this type enables the operator to work with his hands free, when he opens the cassette, but has the disadvantage that it does not allow the cassette to be opened from one side or the other of the cassette, as required.

The invention eliminates this disadvantage.

SUMMARY OF INVENTION

The object of the invention is a stack of at least two cassettes which are articulated in pairs, and each comprises a base and two lateral walls. For each cassette, a first shaft extends parallel to one of the lateral walls, and spaced from the latter towards the exterior, and a second shaft extends parallel to the other one of the lateral walls, and spaced from the latter towards the exterior. Each shaft is supported by at least one lug, which extends from the lateral wall, and is shaped such as to define in succession, from the lateral wall towards the exterior, a first recess and a first catch, and a second recess and a second catch. A detachable rigid connector bar has a branch which ends in a fork, which snaps onto the first shaft (or the second shaft) of two adjacent cassettes. The lug of a first cassette is disposed relative to a lug of a second cassette, adjacent to the first cassette, such that, when the connector bar is snapped onto the first shafts (or second shafts) of the two cassettes, the rotation of the first cassette relative to the second cassette around the first shaft (second shaft) of the first cassette, makes the first catch of the lug of the first cassette come into the first recess of the lug of the second cassette, and/or makes the second catch of the lug of the first cassette come into the second recess of the lug of the second cassette.

By eliminating a flexible hinge, by rendering integral with the cassette shafts which can extend along two edges, which for example are opposite, of the cassette, and by providing a rigid connector bar, an articulation is obtained which can be provided on one side or the other of the cassette, as required. The snapping of the first catch of the upper cassette, which has tilted into the first recess of the lower cassette, makes it possible to keep the upper cassette open for example at 90° from the lower cassette, the snapping preventing a larger angle from being assumed. The same applies to snapping of the second catch.

Preferably, one of the branches of the connector bar has a wall which is substantially parallel to the lateral wall of the cassette in question. The connector bar cannot rotate around the shaft which is held in this branch, and the movement of opening can be carried out flawlessly, the connector bar being rendered integral with the cassette, without any degree of freedom in rotation.

Preferably pair of lugs extends from each lateral wall, the distance between the two lugs of the pair being slightly greater than the width of the connector bar. The connector bar is thus prevented from sliding along the shaft Preferably, six lugs extend from each lateral wall. The six lugs are arranged in two groups that each contain three lugs. This makes it possible to fit two connector bars between each group of three lugs.

A locking clip is also provided, which makes it possible to keep the cassettes on top of one another, on the side opposite to that on which they can tilt.

BRIEF DESCRIPTION OF THE DRAWING

The single FIGURE of the attached drawing is an exploded perspective view, which represents two cassettes in a stack, which can contain considerably more cassettes.

DETAILED DESCRIPTION OF THE DRAWING

The drawing shows two cassettes, a lower cassette A and an upper cassette B, which are identical. Each cassette comprises a base 1, and two opposite lateral walls 2, 3. On the base 1 there is provided a baffle 4, for the coiling of optical fibres, and an inlet 5 and outlet 6 for optical fibres are provided in the lateral walls. From the lateral wall 2, and from the lateral wall 3, and symmetrically, there extend six lugs 7 to 12. The lugs 7 to 9 support a shaft 13 which extends parallel to the lateral wall 2, and spaced from the latter. In the extension of the shaft 13, the lugs 10 to 12 support a shaft 14. Each lug, for example the lug 7, comprises in succession a first recess 15, a first catch 16, and in a part which extends substantially parallel to the wall 2, and perpendicularly to the part which forms the recess 15 and the catch 16, a second recess 18 and a second notch 19.

The entire cassette is moulded in a single piece, with the exception of the detachable rigid connector bars 20, and locking clips 23. Each connector bar 20 consists of two branches 21, 22, which end in a fork, which can snap onto two shafts 13a, 13b of two superimposed cassettes, a being a suffix which shows that the part concerned is part of cassette A, and b showing that it is part of cassette B. The connector bar 20 which forms a hinge is rigid in the sense that it cannot be bent, but the material which constitutes it is sufficiently resilient to allow the forks 21, 22 to be snapped onto the shafts 13. The fork 22 has a wall 25 which is substantially parallel to its lateral wall 2, such that the connector bar 20 cannot rotate relative to the shaft 13a. On the other hand, the shaft 13b can rotate in the fork 21. Each locking clip 23 comprises a handle 24, which facilitates grasping.

When the connector bars 20 are placed on one side, the two cassettes A, B are articulated on that side. When the upper cassette B is opened, by being rotated relative to the shafts 13*b*, the first catch 16*b* comes into the first recess 15*a*, and the second catch 19*b* comes into the second recess 18*a* of the cassette beneath. The cassette is thus kept at 90° in an open position. It can be closed once more by removing the catches from the recesses. If it is wished to open the cassette B on this side, and articulate it on the other, it is sufficient to remove the connector bars 20 and transfer them to the other side.

What is claimed is:

1. A stack comprising at least a first cassette and a second cassette;

said at least a first cassette comprising at least one first lateral wall;

said at least a second cassette comprising at least one second lateral wall;

at least one first lug projecting from said at least one first lateral wall;

at least one second lug projecting from said at least one second lateral wall;

said at least one first lug defining therein at least one first recess and at least one first catch;

said at least one second lug defining therein at least one second recess and at least one second catch, at least one first shaft being supported by said at least one first lug;

at least one second shaft being supported by said at least one second lug; and at least one detachable connector hinge having a first fork ending branch which can snap onto said at least one first shaft and a second fork ending branch which can snap onto said at least one second shaft, so that said at least a first cassette is articulated to said at least a second cassette and so that when said first cassette is rotated away from said second cassette, around said second shaft, said first catch comes into said second recess and when said second cassette is rotated away from said first cassette, around said first shaft, said second catch comes into said first recess.

2. A stack according to claim 1, wherein one of said branches of said connector bar has a wall which is substantially parallel to at least one of said first and second lateral walls.

3. A stack according to claim 1, wherein a pair of lugs extends from each lateral wall, the distance between the two lugs of the pair of lugs being slightly greater than the length of said shaft.

4. A stack according to claim 3, wherein six lugs extend from each lateral wall.

5. A stack according to claim 4, wherein said six lugs are arranged in two groups that each contain three of said lugs.

6. A stack according to claim 1, wherein said lateral walls are aligned with each other.

7. A stack according to claim 2, wherein said lateral walls are aligned with each other.

8. A stack according to claim 3, wherein said lateral walls are aligned with each other.

9. A stack according to claim 4, wherein said lateral walls are aligned with each other.

10. A stack according to claim 5, wherein said lateral walls are aligned with each other.

\* \* \* \* \*